United States Patent
Burckart et al.

(10) Patent No.: US 9,292,247 B2
(45) Date of Patent: Mar. 22, 2016

(54) CO-BROWSING A PAGE INCLUDING CLIPPABLE AND NON-CLIPPABLE PORTIONS

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/826,956

(22) Filed: Jun. 30, 2010

(65) Prior Publication Data

US 2012/0005567 A1 Jan. 5, 2012

(51) Int. Cl.
| | | |
|---|---|---|
| G06F 17/20 | (2006.01) | |
| G06F 3/14 | (2006.01) | |
| G06F 3/048 | (2013.01) | |
| G06F 17/30 | (2006.01) | |

(52) U.S. Cl.
CPC .............. *G06F 3/1454* (2013.01); *G06F 3/048* (2013.01); *G06F 17/30873* (2013.01)

(58) Field of Classification Search
CPC ............................ G06F 3/048; G06F 17/30873
USPC .......................................... 715/234, 759, 760
See application file for complete search history.

(56) References Cited

U.S. PATENT DOCUMENTS

| | | | |
|---|---|---|---|
| 6,230,171 B1 * | 5/2001 | Pacifici et al. ................. | 715/201 |
| 6,871,213 B1 * | 3/2005 | Graham et al. ............... | 709/205 |
| 7,028,306 B2 | 4/2006 | Boloker et al. | |
| 7,149,776 B1 | 12/2006 | Roy et al. | |
| 7,228,496 B2 * | 6/2007 | Hamada ......................... | 715/255 |
| 7,287,054 B2 | 10/2007 | Lee et al. | |
| 7,299,403 B1 * | 11/2007 | Cleasby et al. ............... | 715/738 |
| 7,325,188 B1 * | 1/2008 | Covington et al. ........... | 715/234 |
| 7,370,269 B1 | 5/2008 | Prabhu et al. | |
| 7,469,377 B2 * | 12/2008 | Winser .......................... | 715/238 |
| 7,660,899 B2 | 2/2010 | Gavrilescu et al. | |
| 2003/0204753 A1 * | 10/2003 | Raley et al. .................... | 713/201 |
| 2004/0218036 A1 * | 11/2004 | Boss et al. ................. | 348/14.08 |
| 2006/0010134 A1 * | 1/2006 | Davis et al. .................... | 707/10 |
| 2006/0224973 A1 * | 10/2006 | Albrecht et al. .............. | 715/760 |
| 2008/0052377 A1 * | 2/2008 | Light ............................ | 709/218 |
| 2008/0168388 A1 * | 7/2008 | Decker ......................... | 715/800 |
| 2008/0222295 A1 * | 9/2008 | Robinson et al. ............. | 709/227 |
| 2008/0276183 A1 * | 11/2008 | Siegrist et al. ................ | 715/748 |
| 2010/0082747 A1 | 4/2010 | Yue et al. | |
| 2010/0131868 A1 * | 5/2010 | Chawla et al. ................ | 715/759 |
| 2010/0313239 A1 * | 12/2010 | Chakra et al. ..................... | 726/2 |

(Continued)

OTHER PUBLICATIONS

Greenspan S. et al., Interpersonal Trust and Common Ground in Electronically Mediated Communication, ACM, CSCW '00, Dec. 2-6, 2000, Philadelphia, PA, USA.

*Primary Examiner* — Mohammed-Ibrahim Zuberi
(74) *Attorney, Agent, or Firm* — Jordan IP Law, LLC (57) ABSTRACT

Methods and systems of co-browsing may provide for detecting a selection of clipped content at a local peer device during a co-browsing session between the local peer device and a remote peer device. The clipped content can correspond to a page from a server associated with the co-browsing session. Dependent content and style element data associated with the clipped content may be identified, wherein an event can be sent to the remote peer device via the server. The event may include the clipped content, the dependent content, and the style element data.

20 Claims, 5 Drawing Sheets

(56) References Cited

U.S. PATENT DOCUMENTS

| | | | |
|---|---|---|---|
| 2011/0191676 A1* | 8/2011 | Guttman et al. | 715/716 |
| 2011/0202850 A1* | 8/2011 | Chan et al. | 715/745 |
| 2011/0270778 A1* | 11/2011 | Mondal | 705/36 R |
| 2014/0108542 A1* | 4/2014 | Cheng et al. | 709/204 |

* cited by examiner

FIG. 1

FIG. 2

CO-BROWSING A PAGE INCLUDING CLIPPABLE AND NON-CLIPPABLE PORTIONS

BACKGROUND

1. Technical Field

Embodiments of the present invention generally relate to co-browsing sessions. More particularly, embodiments relate to page clipping during co-browsing sessions.

2. Discussion

Web widgets may support peer-to-peer co-browsing sessions in which two users share viewed pages and may even highlight portions of the pages. There are some scenarios, however, in which both users cannot view the same page (e.g., page contains personalized content) or a particular user does not want the entire page to be visible to the other user (e.g., page contains sensitive content).

BRIEF SUMMARY

Embodiments may provide for a computer program product including a computer readable storage medium and computer usable code stored on the computer readable storage medium. If executed by a processor, the computer usable code causes a computer to detect a selection of clipped content at a local peer device during a co-browsing session between the local peer device and a remote peer device. The clipped content can correspond to a page from a server associated with the co-browsing session. The computer usable code, if executed, may also identify dependent content and style element data associated with the clipped content, and send an event to the remote peer device via the server. The event can include the clipped content, the dependent content and the style element data. In one example, the local peer device withholds content in the page other than the clipped content, the dependent content and the style element data.

Embodiments may also provide for a computer program product including a computer readable storage medium and computer usable code stored on the computer readable storage medium. If executed by a processor, the computer usable code causes a computer to establish a co-browsing session between a first peer device and a second peer device, and to transmit a page to the first peer device. The computer usable code, if executed, can also cause a computer to receive an event from the first peer device, wherein the event includes clipped content, dependent content associated with the clipped content and style element data associated with the clipped content. In addition, the computer usable code may provide for transmitting the event to the second peer device.

Other embodiments can include a computer program product including a computer readable storage medium and computer usable code stored on the computer readable storage medium. If executed by a processor, the computer usable code causes a computer to receive an event at a local peer device during a co-browsing session between the local peer device and a remote peer device. The event may include clipped content, dependent content associated with the clipped content, and style element data associated with the clipped content. The computer usable code, if executed, can also cause a computer to open a page, apply the style element data to the page, add the clipped content and the dependent content to the page, and display the page at the local peer device.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
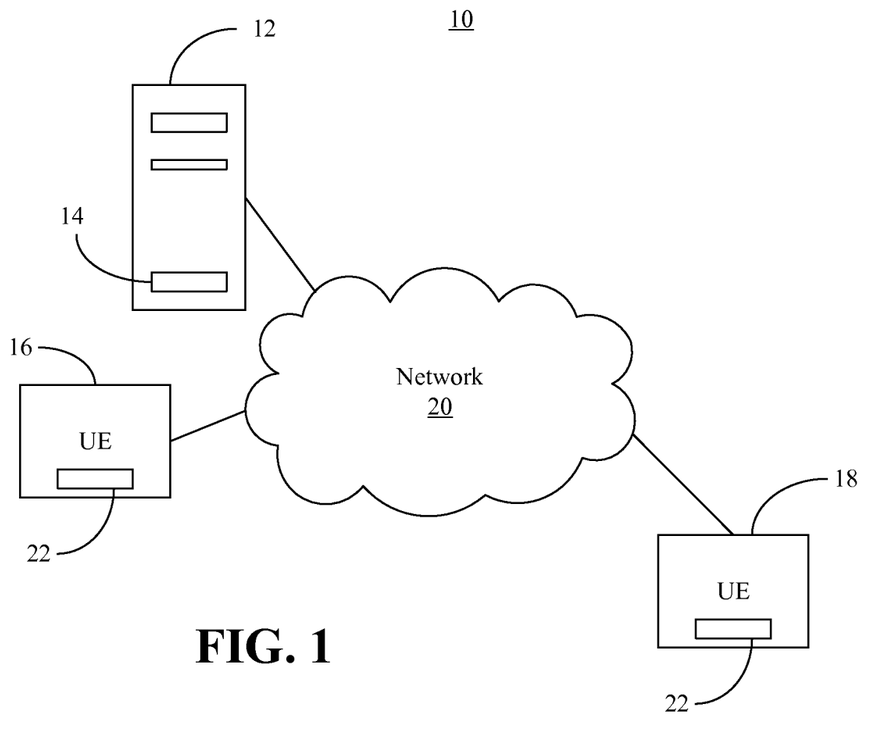
FIG. 1 is a block diagram of an example of a networking architecture according to an embodiment.

Referring now to FIG. 1, a networking architecture 10 is shown in which a server 12 includes logic 14 to establish and maintain a co-browsing session between a first user equipment (UE) device 16 and a second UE device 18, as well as to support page clipping between the UE devices 16, 18. The UE devices 16, 18 can also include logic 22 to participate in co-browsing sessions and share clipped portions of pages with one another. In the illustrated example, the UE devices 16, 18, which may include web browsing capability and can function as peer devices in co-browsing sessions, may include a personal computer (PC), notebook computer, personal digital assistant (PDA), wireless smartphone, or other device having access to the server 12, via a network 20. The UE device connection to the network 20 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE devices 16, 18 and/or server 12 could be located in the same physical location or in different locations.

In addition, the network 20 can include any suitable combination of servers, access points, routers, base stations, mobile switching centers, public switching telephone network (PSTN) components, etc., to facilitate communication between the UE devices 16, 18 and the server 12. The server 12 may include distributed and/or redundant web-based servers that are able to respond to web page requests for content. Thus, the server 12 can have stored thereon hypertext markup language (HTML) and other markup language-encoded content, as well as databases and applications such as Java and other applications. The server 12 could also be part of a cloud computing environment in which resources are shared across platforms in a complex fashion.

Generally, each UE device 16, 18 uses the logic 22 to enable a user to select clipped content from a displayed page and share the clipped content, as well as it's associated dependent content and style element data, with the other UE device 16, 18. As will be discussed in greater detail, content in the page other than the clipped content and its associated dependent content and style data can be withheld from the other UE device 16, 18.

Figure 2:
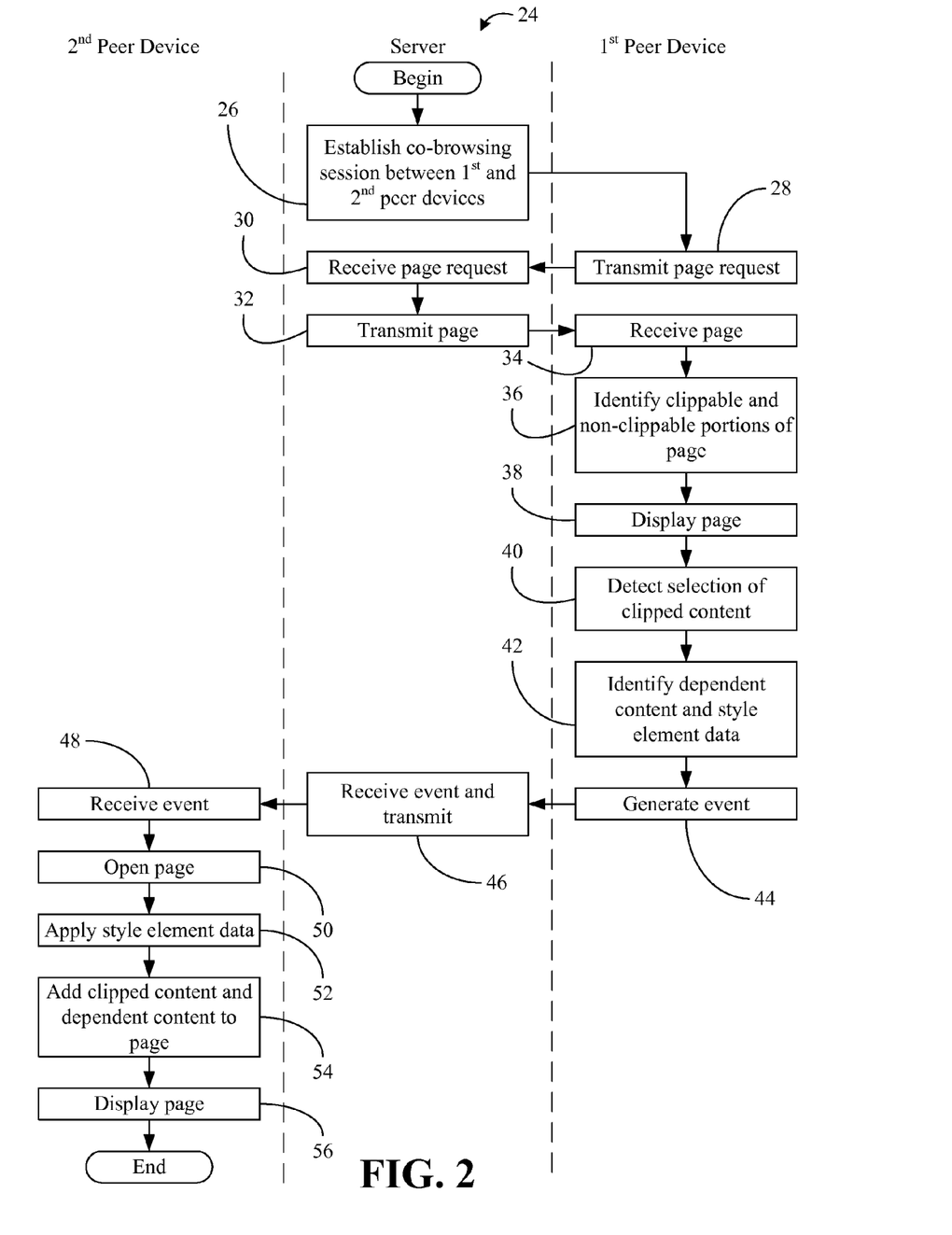
FIG. 2 is a flowchart of an example of a page clipping sequence according to an embodiment.

FIG. 2 shows a method 24 in which clipped content is shared between peer devices. The method 24 could be implemented in executable software as a set of logic instructions stored in a machine- or computer-readable medium such as random access memory (RAM), read only memory (ROM), programmable ROM (PROM), flash memory, etc., as fixed-functionality hardware using circuit technology such as application specific integrated circuit (ASIC), complementary metal oxide semiconductor (CMOS) or transistor-transistor logic (TTL) technology, or any combination thereof.

Processing block 26 provides for establishing a co-browsing session between a first peer device and a second peer device. The co-browsing session might be initiated by either the first or second peer device by activating an appropriate web widget or other application software. In the illustrated example, the first peer device transmits a page request to the server hosting the co-browsing session at block 28, wherein the server can receive the page request at block 30 and respond with the requested page at block 32. The transmitted page could relate to a wide variety of activities including, but not limited to, electronic commerce (e-commerce), multimedia, gaming, business-to-business (B2B), and so on. Moreover, the page could be generated locally at the first peer device using Java or other similar programming languages. In one example, the page includes content that is personalized with respect to the first peer device (e.g., shopping cart or other cookie-based content) so that the personalized content is not readily available to the second peer device. The page might also include sensitive content such as passwords, account numbers, etc., that the user of the first peer device may not wish to disclose to the second peer device during the co-browsing session.

Upon receipt of the page at block 34, the first peer device may identify "clippable" and "non-clippable" portions of the page at block 36. A clippable portion of the page can be considered to include any content on the page that may be clipped and shared with another peer in a co-browsing session. Certain content such as sensitive content might be flagged as non-clippable and withheld from clip sharing operations. The identification at block 36 could be implemented in a number of different ways. For example, a web application might be invoked to identify the clippable portion and/or the clippable portion could be identified based on one or more tags in the page. Moreover, a transparent division (div, e.g., grayed out overlay) may be applied to the non-clippable portion of the page to aid the user of the first peer device in clipping content from the page and to facilitate easier collaboration between peers. For example, the transparent div could be applied to any sensitive content that should not be shared in the co-browsing session. Block 38 provides for displaying the page in a browser such as Firefox from Mozilla, Internet Explorer from Microsoft, etc.

If a selection of clipped content from the page is detected at block 40, block 42 provides identifying dependent content associated with the clipped content. In particular, the illustrated approach could access the nested hierarchy of HTML code in the page (e.g., using the innerHTML property) to identify the children of the clipped content in the hierarchy. The dependent content might also include position and size information to ensure that the clipped content can be placed in the proper location of the page by the other peer device. In addition, the clipped content can be parsed to identify the style element data such as cascading style sheet (CSS) elements and CSS rules associated with the clipped content. The style element data can enable an accurate reproduction of the clipped content at the other end of the co-browsing session. The style of the page might also be modified in the page at the first peer device in order to highlight the currently clipped content (and its dependent content) to the user of the first peer device. The highlighting style information could be incorporated with the other CSS elements and CSS rules into the style element data.

Illustrated block 44 provides for generating a clip event based on the clipped content, as well as the dependent content and the style element data associated with the clipped content. The generated event may be sent to the server associated with the co-browsing session, wherein block 46 provides for receiving the clip event at the server and transmitting the clip event to the second peer device. The clip event can be received by the second peer device at block 48. Illustrated block 50 provides for opening a blank page, wherein the style element data included in the clip event may be applied to the blank page at block 52. In addition, the clipped content and the dependent content can be added to the style-formatted page at block 54. The process at block 54 could also include implementing any position and sizing information contained in the clip event in order to position the clipped content in the proper location. Block 56 provides for displaying the constructed page at the second peer device.

Figure 3A:
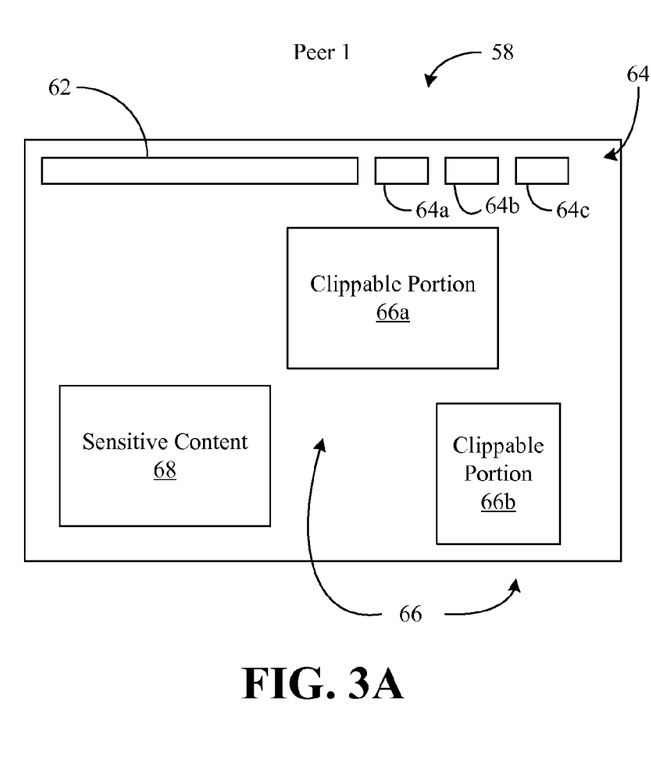
FIGS. 3A and 3B are diagrams of examples of page views prior to selection of clipped content according to an embodiment.
Figure 3B:
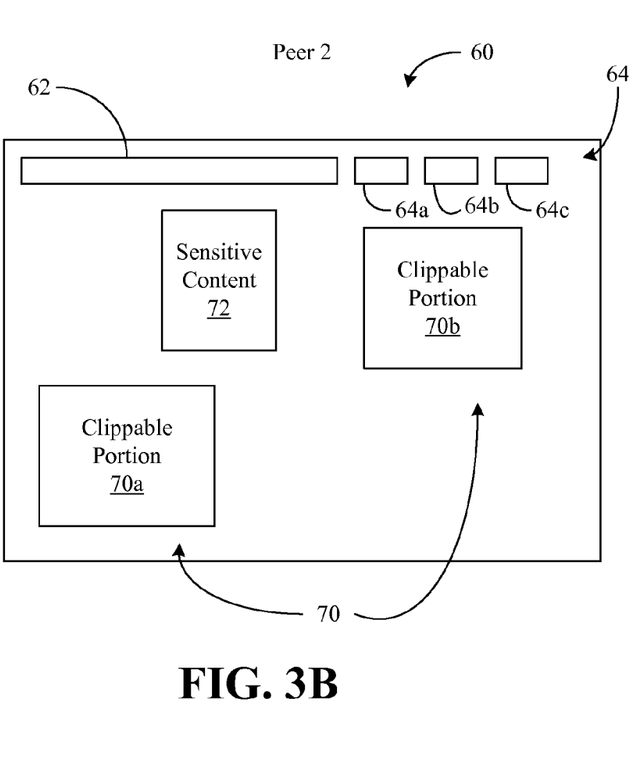

Turning now to FIGS. 3A and 3B, pages 58 and 60 are shown for a first peer device and a second peer device, respectively. Each of the illustrated pages 58, 60 includes an address bar 62 and one or more control buttons 64 to initiate a variety of co-browsing related functions such as clipping content (e.g., a "Highlight" button), sending clipped content (e.g., a "Send Page" button), inviting other peer devices to follow the local peer device (e.g., a "Follow Me" button), and granting remote control over the local peer device (e.g., a "Grant Control" button). In addition, each page 58, 60 may generally include a clippable portion and a non-clippable portion, wherein users can clip and share content from the clippable portion and content from the non-clippable portion can be withheld from clipping operations in a co-browsing session. For example, the illustrated page 58 of the first peer device has a clippable portion 66 (66a-66b), wherein the remainder of the page 58 is non-clippable. Thus, the non-clippable portion might include sensitive content 68, such as passwords, account numbers, account balances, etc., that the user of the first peer device may wish to prevent from view on the second peer device. A transparent div could be placed over the non-clippable portion of the page to prevent clipping of unwanted areas of the page.

Moreover, the clippable portion 66 could include content that is customized with respect to the first peer device and not readily accessible by the second peer device. For example, the clippable portion 66a could include a shopping basket generated by the user of the first peer device while browsing an e-commerce web site, and the clippable portion 66b might include an indication of more buying choices that is generated by a web application based on the shopping history and/or preferences of the user of the first peer device. Thus, if the user of the second peer device navigates to the same address of the page 58, the content in the clippable portions 66 may not be viewable or shown in the page 60 displayed in the browser of the second peer device because the content in the clippable portions 66 is customized to the user of the first peer device. Indeed, the page 60, which may be for the same web page address as page 60 or a different address, includes a different clippable portion 70 (70a-70b) and non-clippable portion with sensitive content 72 altogether.

Figure 4A:
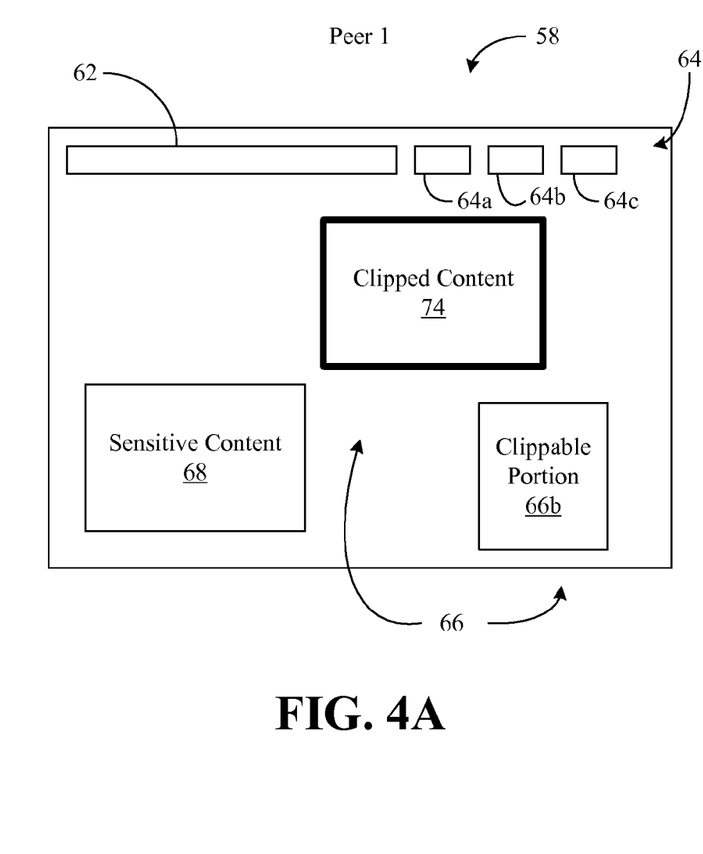
FIGS. 4A and 4B are diagrams of examples of page views after selection of clipped content according to an embodiment.
Figure 4B:
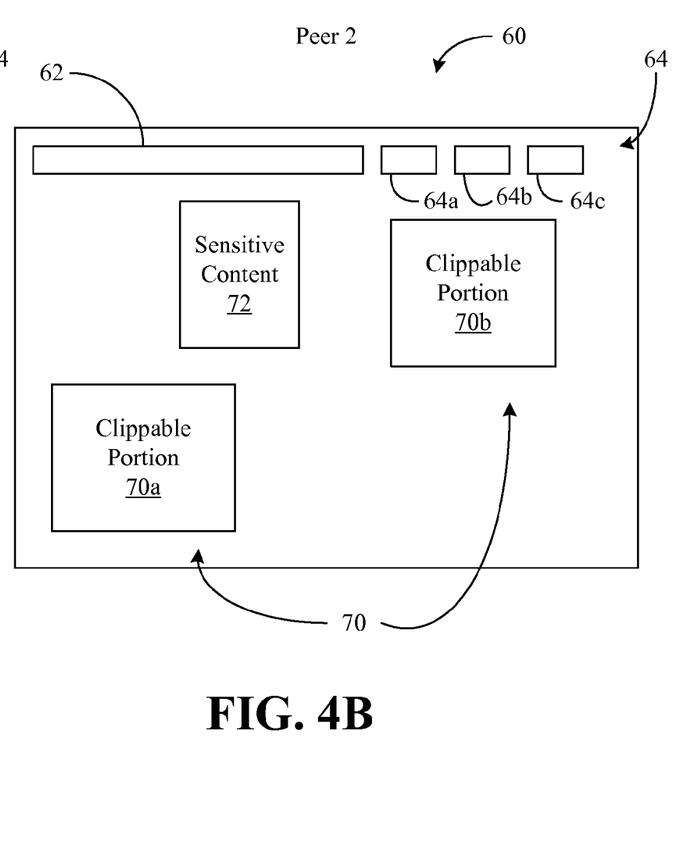

FIGS. 4A and 4B demonstrate that the user of the first peer device may make a selection from the page 58, so that the clippable portion 66a (FIG. 3A) becomes clipped content 74. The selection could be made by a mouse over, click, box drag, etc., and/or by selecting a "Highlight" button from the control buttons 64. The other clippable portion 66b might also be selected concurrently with the clippable portion 66a (FIG. 3A) or subsequent to the selection of the clippable portion 66a (FIG. 3A). In the illustrated example, the style of the clipped content 74 is modified to highlight the selection to the user of the first peer device. As already noted, the selection of the clipped content 74 may initiate an identification of the dependent content in the page 58 associated with the clipped content 74, as well as an identification of any style element data (e.g., CSS elements, CSS rules, etc.) associated with the clipped content 74. The dependent content, which could include position and size information for the clipped content 74, might be identified through the use of the inner HTML property.

Figure 5A:
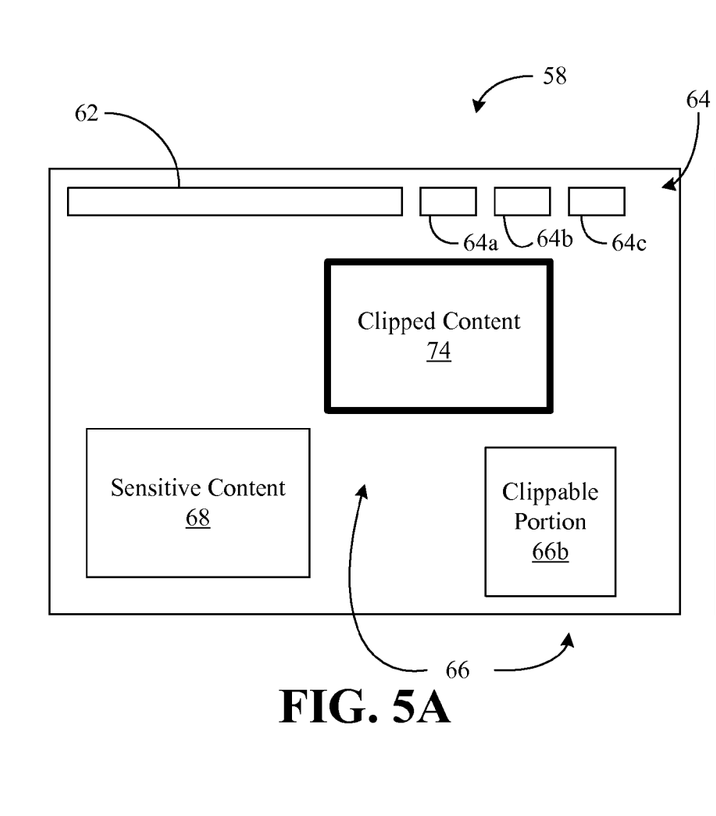
FIGS. 5A and 5B are diagrams of examples of page views after transmission of a clipping event between peer devices according to an embodiment.
Figure 5B:
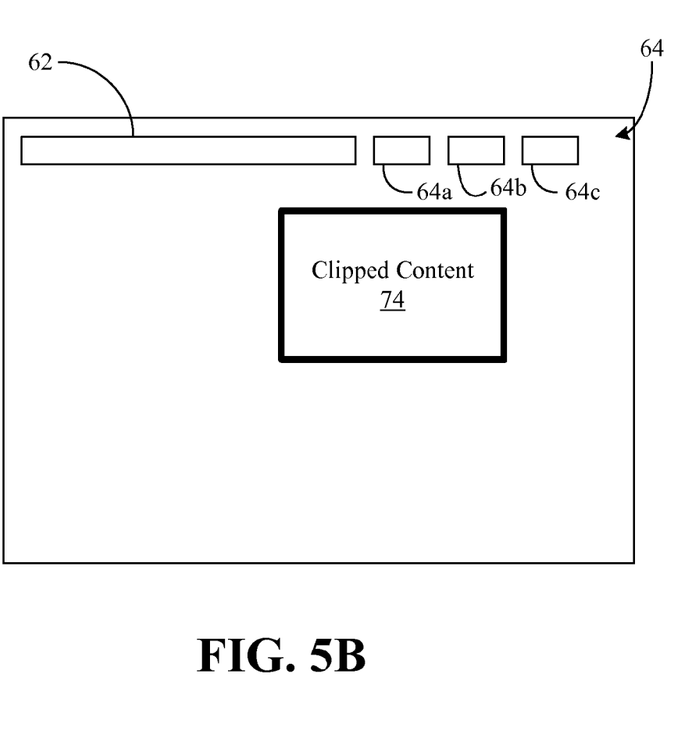

Turning now to FIGS. 5A and 5B, one example of the sharing of clipped content between peers is shown. In the illustrated example, the user of the first peer device selects a "Send Page" button from the control buttons 64 to cause the transmission of a clip event to the server hosting the co-browsing session, as already discussed. The server may forward the event to the second peer device, which can use the clip event to construct a clipped page 76. The illustrated clipped page 76 includes the clipped content 74, wherein the clipped content is personalized to the first peer device and might not otherwise be available to the second peer device. Moreover, the illustrated clipped page does not include the non-clippable portion of the page 58, which includes sensitive content 68. As already noted, the first peer device could also share the clippable portion 66b either via the same clip event as the clipped content 74 on via a different clip event.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
   a non-transitory computer readable storage medium; and
   computer usable code stored on the non-transitory computer readable storage medium, where, if executed by a processor, the computer usable code causes a computer to:
      identify a clippable portion of a page and a non-clippable portion of the page in response to receipt of the page at a local peer device during a co-browsing session, wherein the clippable portion is to be involved in a clipping operation including a selection of specific page content within the page by a user of the local peer device and a share of the page content, and wherein the non-clippable portion is to be withheld from both the selection of the specific page content by the user of the local peer device and the share of the specific page content;
      display the page at the local peer device;
      detect the selection of the specific page content within the page by the user of the local peer device to generate clipped content including the specific page content and excluding content of the non-clippable portion during the cobrowsing session between the local peer device and a remote peer device;
      identify dependent content and style element data associated with the clipped content at the local peer device in response to the selection of the specific page content by the user of the local peer device, wherein the style element data is to include style language data;
      generate a clip event at the local peer device including the specific page content, the dependent content, and the style element data; and
      send the clip event from the local peer device to the remote peer device to share the specific page content, the dependent content, and the style element data via a server associated with the co-browsing session, wherein the clip event is to be implemented at the remote peer device and not at the local peer device and not at the server.

2. The computer program product of claim 1, wherein the clipped content is to be personalized in the page with respect to the local peer device.

3. The computer program product of claim 1, wherein the computer usable code, if executed, further causes a computer to:
   send a request from the local peer device to the server for the page, wherein the server is to be located between the local peer device and a remote peer device; and
   receive the page from the server.

4. The computer program product of claim 3, wherein the computer usable code, if executed, further causes a computer to apply a transparent division to the non-clippable portion of the page.

5. The computer program product of claim 3, wherein the computer usable code, if executed, further causes a computer to invoke a web application function to identify the clippable portion.

6. The computer program product of claim 3, wherein the computer usable code, if executed, further causes a computer to identify the clippable portion based on one or more tags in the page.

7. The computer program product of claim 1, wherein the computer usable code, if executed, further causes a computer to identify the dependent content based on an innerHTML property associated with the clipped content.

8. The computer program product of claim 7, wherein the dependent content is to include position and size information associated with the clipped content.

9. The computer program product of claim 1, wherein the computer usable code, if executed, further causes a computer to parse the clipped content to identify the style element data.

10. The computer program product of claim 1, wherein the style element data is to include one or more cascading style sheet (CSS) elements and one or more CSS rules.

11. The computer program product of claim 1, wherein the computer usable code, if executed, further causes a computer to send an event to the remote peer device for a plurality of regions in the page.

12. A computer program product comprising:
    a non-transitory computer readable storage medium; and
    computer usable code stored on the non-transitory computer readable storage medium, wherein, if executed by a processor, the computer usable code causes a computer to:
       establish a co-browsing session between a first peer device and a second peer device;
       transmit a page to the first peer device, wherein the page is to include a clippable portion and a non-clippable portion, wherein the clippable portion is to be involved in a clipping operation including a selection of specific page content within the page by a user of the first peer device and a share of the specific page content, and wherein the non-clippable portion is to be withheld from both the selection of the specific page content by the user of the first peer device and the share of the specific page content;
       receive a clip event to be genarated at the first peer device that is to include clipped content including the specific page content and excluding content of the non-clippable portion by the selection of the specific page content by the user of the first peer device, dependent content associated with the clipped content, and style element data associated with the clipped content including style language data, wherein the dependent content and style element data associated with the clipped content are to be identified at the first peer device in response to the selection of the specific page content by the user of the first peer device; and transmit the clip event that is to be received from the first peer device to the second peer device to share the specific page content, the dependent content, and the style element data without implementing the clip event that is to be implemented at the second peer device and not at the first peer device.

13. The computer program product of claim 12, wherein the computer usable code, if executed, further causes a computer to personalize the clipped content in the page with respect to the first peer device.

14. The computer program product of claim 12, wherein the computer usable code, if executed, further causes a computer to identify a clippable portion of the page with one or more tags.

15. The computer program product of claim 12, wherein the computer usable code, if executed, further causes a computer to apply a transparent division to a nonclippable portion of the page.

16. The computer program product of claim 12, wherein the style element data is to include one or more cascading style sheet (CSS) elements and one or more CSS rules.

17. A computer program product comprising:
a non-transitory computer readable storage medium; and
computer usable code stored on the non-transitory computer readable storage medium, where, if executed by a processor, the computer usable code causes a computer to:
receive a clip event at a local peer device from a server during a co-browsing session between the local peer device and a remote peer device, wherein the clip event is to be generated at the remote peer device to share the specific page content, dependent content, and style element data, and is to be associated with a first page that is to include a clippable portion and a non-clippable portion, wherein the clippable portion is to be involved in a clipping operation including a selection of the specific page content within the first page by a user of the remote peer device and a share of the specific page content, and wherein the non-clippable portion is to be withheld from both the selection of the specific page content by the user of the remote peer device and the share of the specific page content;
determine from the clip event clipped content including the specific page content and excluding content of the non-clippable portion to be generated by the selection of the specific page content by the user of the remote peer device, the dependent content associated with the clipped content, and the style element data associated with the clipped content including style language data, wherein the dependent content and style element data associated with the clipped content are to be identified at the remote peer device in response to the selection of the specific page content by the user of the remote peer device;
implement the clip event at the local peer device that is not to be implemented at the remote peer device and not at the server, wherein the local peer device is to:
open a second page in response to receipt of the clip event from the server;
apply the style element data to the second page at the local peer device;
add the clipped content and the dependent content to the second page at the local peer device; and
display the second page at the local peer device.

18. The computer program product of claim 17, wherein the clipped content is to be personalized with respect to the remote peer device.

19. The computer program product of claim 17, wherein the dependent content is to include position and size information associated with the clipped content.

20. The computer program product of claim 7, wherein the computer usable code, if executed, further causes a computer to access a nested hierarchy of code in the page to identify a child of the clipped content in the nested hierarchy.

* * * * *

UNITED STATES PATENT AND TRADEMARK OFFICE
CERTIFICATE OF CORRECTION

| | | |
|---|---|---|
| PATENT NO. | : 9,292,247 B2 | |
| APPLICATION NO. | : 12/826956 | |
| DATED | : March 22, 2016 | |
| INVENTOR(S) | : Erik J. Burckart et al. | |

It is certified that error appears in the above-identified patent and that said Letters Patent is hereby corrected as shown below:

On the Title Page and in the Specification, Col. 1, in the title, delete "a page including clippable and non-clippable portions," and insert -- page clipping --, therefor.

Signed and Sealed this
Seventh Day of June, 2016

Michelle K. Lee
*Director of the United States Patent and Trademark Office*